United States Patent
Keating et al.

(10) Patent No.: US 12,047,328 B2
(45) Date of Patent: Jul. 23, 2024

(54) TIMING ADVANCE VALIDATION AND ADJUSTMENT

(71) Applicant: Nokia Technologies Oy, Espoo (FI)

(72) Inventors: Ryan Keating, Chicago, IL (US); Rapeepat Ratasuk, Inverness, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 424 days.

(21) Appl. No.: 17/433,253

(22) PCT Filed: Feb. 25, 2020

(86) PCT No.: PCT/FI2020/050117
§ 371 (c)(1),
(2) Date: Aug. 24, 2021

(87) PCT Pub. No.: WO2020/188144
PCT Pub. Date: Sep. 24, 2020

(65) Prior Publication Data
US 2022/0094508 A1    Mar. 24, 2022

Related U.S. Application Data

(60) Provisional application No. 62/818,867, filed on Mar. 15, 2019.

(51) Int. Cl.
*H04L 5/00* (2006.01)
*H04B 7/06* (2006.01)
(Continued)

(52) U.S. Cl.
CPC .......... *H04L 5/0085* (2013.01); *H04L 5/0048* (2013.01); *H04L 5/006* (2013.01)

(58) Field of Classification Search
CPC ..... H04L 5/0048; H04L 5/005; H04L 5/0051; H04L 5/0058; H04L 5/006; H04L 5/0078; H04L 5/0085
See application file for complete search history.

(56) References Cited

U.S. PATENT DOCUMENTS 6,687,501 B2   2/2004  Soliman
11,304,174 B2 *  4/2022  Kim ...................... H04L 5/0094
(Continued)

FOREIGN PATENT DOCUMENTS

WO   2014/113537 A1   7/2014

OTHER PUBLICATIONS

"Draft Report of 3GPP TSG RAN WG1 #94bis v0.1.0", 3GPP TSG RAN WG1 Meeting #95, R1-181xxxx, MCC Support, Nov. 12-16, 2018, pp. 1-189.
(Continued)

*Primary Examiner* — Jenee Holland
(74) *Attorney, Agent, or Firm* — Lippes Mathias LLP

(57) ABSTRACT

Systems, methods, apparatuses, and computer program products for timing advance (TA) validation and/or adjustment, for example in 5G NR, are provided. One method may include configuring, by a network node, at least one user equipment for at least one preconfigured uplink resource (PUR), and, before moving to idle or inactive mode, configuring the at least one user equipment to measure time of arrival (TOA) on a plurality of beams from a plurality of network nodes and to determine reference signal time difference (RSTD) values (600). The method may also include receiving data from the at least one user equipment using the at least one preconfigured uplink resource (PUR) (630).

20 Claims, 6 Drawing Sheets

(51) Int. Cl.
*H04B 17/364* (2015.01)
*H04B 17/382* (2015.01)
*H04W 24/08* (2009.01)
*H04W 24/10* (2009.01)
*H04W 52/02* (2009.01)
*H04W 56/00* (2009.01)
*H04W 72/21* (2023.01)
*H04W 76/27* (2018.01)

(56) References Cited

U.S. PATENT DOCUMENTS

| | | | | |
|---|---|---|---|---|
| 2013/0301619 A1* | 11/2013 | Singh | H04W 56/0045 |
| | | | 370/336 |
| 2017/0195998 A1* | 7/2017 | Zhang | H04W 52/365 |
| 2017/0231011 A1* | 8/2017 | Park | H04W 72/0446 |
| 2019/0053182 A1* | 2/2019 | Choi | H04W 72/0453 |
| 2019/0053234 A1* | 2/2019 | Cui | H04W 72/0446 |
| 2019/0069314 A1* | 2/2019 | Takeda | H04W 16/28 |
| 2019/0116605 A1* | 4/2019 | Luo | H04W 72/0446 |
| 2019/0207722 A1* | 7/2019 | Gao | H04B 7/088 |
| 2019/0215888 A1* | 7/2019 | Cirik | H04B 7/088 |
| 2019/0361111 A1* | 11/2019 | Sadiq | G01S 5/0215 |
| 2019/0364535 A1* | 11/2019 | Sadiq | H04W 4/029 |
| 2019/0373594 A1* | 12/2019 | Sadiq | H04W 72/23 |
| 2019/0380054 A1* | 12/2019 | Manolakos | H04L 5/0094 |
| 2020/0014455 A1* | 1/2020 | Gao | H04B 7/063 |
| 2020/0014514 A1* | 1/2020 | Gao | H04W 72/04 |
| 2020/0145977 A1* | 5/2020 | Kumar | G01S 5/12 |
| 2022/0094508 A1* | 3/2022 | Keating | H04L 5/0048 |

OTHER PUBLICATIONS

"3rd Generation Partnership Project; Technical Specification Group Radio Access Network; Evolved Universal Terrestrial Radio Access (E-UTRA); Physical layer; Measurements (Release 15)", 3GPP TS 36.214, V15.3.0, Sep. 2018, pp. 1-25.

"Beam management enhancement for NR positioning", 3GPP TSG RAN WG1 Meeting AH 1901, R1-1900703, Agenda: 7.2.10.1.1, Spreadtrum Communications, Jan. 21-25, 2019, 3 pages.

International Search Report and Written Opinion received for corresponding Patent Cooperation Treaty Application No. PCT/FI2020/050117, dated Jun. 16, 2020, 14 pages.

"Support for transmission in preconfigured UL resources in NB-IoT", 3GPP TSG-RAN WG1 Meeting #94bis, R1-1810195, Agenda: 6.2.2.2, Ericsson, Oct. 8-12, 2018, pp. 1-8.

"PUR TA validation & Release", 3GPP TSG-RAN WG2 #105, R2-1900737, Agenda: 12.2.4, Ericsson, Feb. 25-Mar. 1, 2019, pp. 1-4.

* cited by examiner

TIMING ADVANCE VALIDATION AND ADJUSTMENT

RELATED APPLICATION

This application was originally filed as PCT Application No. PCT/FI2020/050117 on Feb. 25, 2020, which claims priority from US Provisional Application No. 62/818,867, filed on Mar. 15, 2019, each of which is incorporated herein by reference in its entirety.

CROSS-REFERENCE TO RELATED APPLICATIONS

This application claims priority from U.S. provisional patent application No. 62/818,867 filed on Mar. 15, 2019. The contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for timing advance (TA) validation and adjustment in 5G NR.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR provides bitrates on the order of 10-20 Gbit/s or higher, and can support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

One embodiment is directed to an apparatus that may include at least one processor and at least one memory comprising computer program code. The at least one memory and computer program code may be configured, with the at least one processor, to cause the apparatus at least to configure at least one user equipment for at least one preconfigured uplink resource (PUR), or, before moving to idle or inactive mode, configure the at least one user equipment to measure time of arrival (TOA) on a plurality of beams from a plurality of network nodes and to determine reference signal time difference (RSTD) values. The at least one memory and computer program code may also be configured, with the at least one processor, to cause the apparatus at least to receive data from the at least one user equipment using the at least one preconfigured uplink resource (PUR).

Another embodiment is directed to a method that may include configuring, by a network node, at least one user equipment for at least one preconfigured uplink resource (PUR), or, before moving to idle or inactive mode, configuring the at least one user equipment to measure time of arrival (TOA) on a plurality of beams from a plurality of network nodes and determining reference signal time difference (RSTD) values. The method may also include receiving data from the at least one user equipment using the at least one preconfigured uplink resource (PUR).

Another embodiment is directed to an apparatus that may include means for configuring at least one user equipment for at least one preconfigured uplink resource (PUR), or, before moving to idle or inactive mode, means for configuring the at least one user equipment to measure time of arrival (TOA) on a plurality of beams from a plurality of network nodes and determining reference signal time difference (RSTD) values. The method may also include means for receiving data from the at least one user equipment using the at least one preconfigured uplink resource (PUR).

Another embodiment is directed to an apparatus that may include at least one processor and at least one memory comprising computer program code. The at least one memory and computer program code configured, with the at least one processor, to cause the apparatus at least to measure time of arrival (TOA) on a plurality of beams from a plurality of network nodes, where the apparatus is configured with preconfigured uplink resource (PUR), to determine reference signal time difference (RSTD) values, when the apparatus has data to transmit using the preconfigured uplink resource (PUR), to receive reference signal on a plurality of beams and measuring the first arrival time of arrival (TOA) across the plurality of beams to determine if beam indexes are still valid, to select one or more of the beam indexes of a best or first beams using the first arrival time of arrival (TOA) across the multiple reference signal beams, to calculate the reference signal time difference (RSTD) between the reference signal received on the best or first beams from each of the network nodes, and to perform timing advance (TA) validation using the calculated reference signal time difference (RSTD) and reference signal (RS) beam indexes.

Another embodiment is directed to method that may include measuring, at a preconfigured uplink resource (PUR) configured user equipment, time of arrival (TOA) on a plurality of beams from a plurality of network nodes, determining reference signal time difference (RSTD) values, when the user equipment has data to transmit using the preconfigured uplink resource (PUR), receiving reference signal on a plurality of beams and measuring the first arrival time of arrival (TOA) across the plurality of beams to determine if beam indexes are still valid, selecting one or more of the beam indexes of a best or first beams using the first arrival time of arrival (TOA) across the multiple reference signal beams, calculating the reference signal time difference (RSTD) between the reference signal received on the best or first beams from each of the network nodes, and performing timing advance (TA) validation using the calculated reference signal time difference (RSTD) and reference signal (RS) beam indexes.

Another embodiment is directed to an apparatus that may include means for measuring time of arrival (TOA) on a plurality of beams from a plurality of network nodes, wherein the apparatus is configured for preconfigured uplink resource (PUR), means for determining reference signal time difference (RSTD) values, when the apparatus has data to transmit using the preconfigured uplink resource (PUR), means for receiving reference signal on a plurality of beams and measuring the first arrival time of arrival (TOA) across the plurality of beams to determine if beam indexes are still valid, means for selecting one or more of the beam indexes of a best or first beams using the first arrival time of arrival (TOA) across the multiple reference signal beams, means for calculating the reference signal time difference (RSTD) between the reference signal received on the best or first beams from each of the network nodes, and means for performing timing advance (TA) validation using the calculated reference signal time difference (RSTD) and reference signal (RS) beam indexes.

BRIEF DESCRIPTION OF THE DRAWINGS

For proper understanding of example embodiments, reference should be made to the accompanying drawings, wherein.

DETAILED DESCRIPTION

Figure 1:
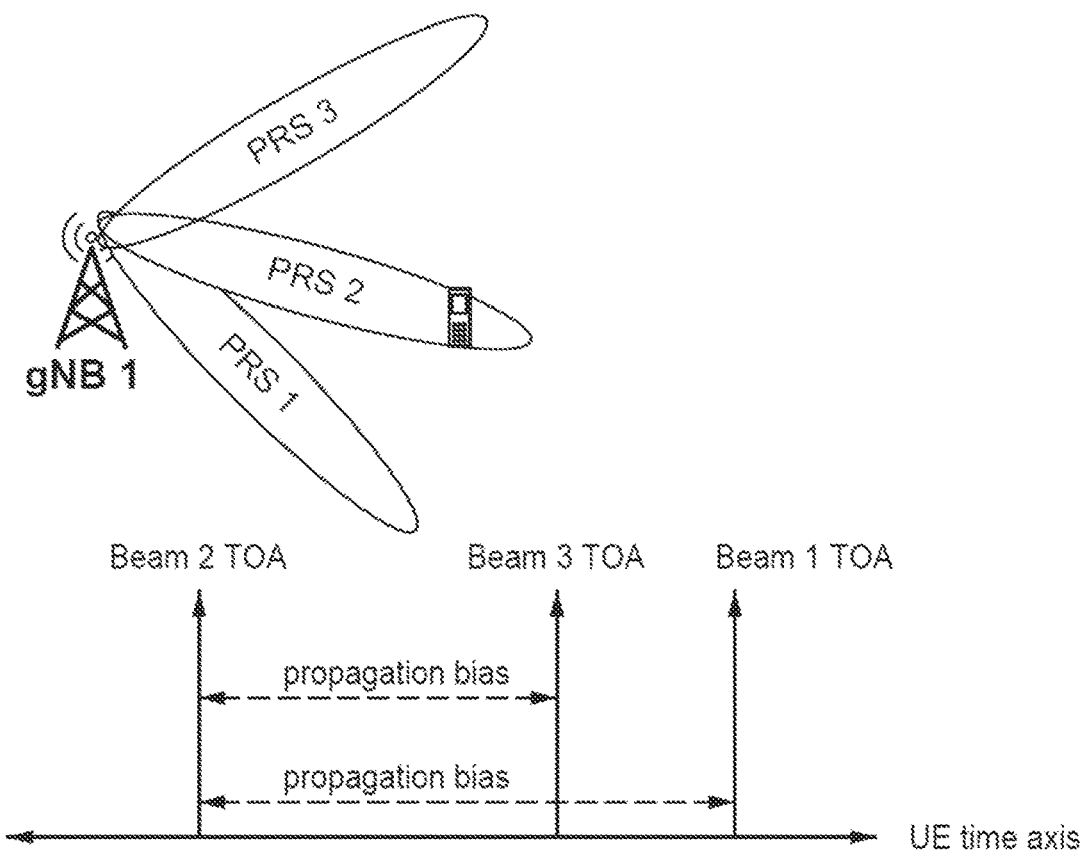
FIG. 1 illustrates an example system depicting how beam index is selected, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for timing advance (TA) validation and/or adjustment, for example in 5G NR, is not intended to limit the scope of certain embodiments but is representative of selected example embodiments.

The features, structures, steps, or characteristics of example embodiments described throughout this specification may be combined in any suitable manner in one or more example embodiments. For example, the usage of the phrases "certain embodiments," "some embodiments," or other similar language, throughout this specification may refer to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, steps, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

In the $3^{rd}$ Generation Partnership Project (3GPP) Release-16 enhanced machine type communication (eMTC) and narrowband IoT (NB-IoT), transmission using preconfigured uplink resource (PUR) is being introduced. The PUR feature allows a UE in idle or inactive mode to transmit in the uplink (UL) using a preconfigured resource. This may also be referred to as grant-free transmission. However, prior to transmission, the UE needs to perform timing advance (TA) validation to check whether it still has a valid timing advance value. The criteria for TA validation include serving cell changes (serving cell refers to the cell that the UE is camping on), time alignment timer (TAT) for idle mode, and/or serving cell reference signal received power (RSRP) changes. Other criteria that may be considered further include subscription information (e.g., for stationary UEs) and cell-specific indication of whether the TA is always valid within the cell (e.g., for small cells).

In 3GPP Release-17, it is expected that NR-based IoT (NR-IoT) or NR-LITE will be introduced to address use cases between Massive MTC (mMTC) and Ultra-Reliable Low-Latency Communication (URLLC). One goal of NR-IoT is to support industrial IoT deployment using low-cost, low-complexity devices with long battery life. Some example requirements for NR-IoT may include: data rates up to 10-100 Mbps to support for example live video feed, visual production control, and process automation; latency of around 10-30 ms to support for example remote drone operation, cooperative farm machinery, time-critical sensing and feedback, and remote vehicle operation; and positioning accuracy of about 30 cm-1 m to support for example indoor asset tracking, coordinated vehicle control, and remote monitoring.

Support for PUR in Release-17 or beyond NR-IoT is needed to meet at least the low latency requirement. However, the TA validation criteria for PUR being standardized in Release-16 eMTC and NB-IoT (e.g., RSRP measurement which is filtered and therefore changes slowly) are not sufficient for NR-IoT as they are long-term in nature and more appropriate for devices with no mobility or low mobility. Therefore, a new TA validation method that can react quickly to UE's movement is needed for NR-IoT.

As will be discussed in more detail below, certain embodiments may be configured to use the Reference Signal Time Difference (RSTD) and received beam index for TA validation as part of a PUR procedure. In addition, according to some embodiments, a UE may perform autonomous TA adjustment using RSTD measurement(s). Similarly, according to some embodiments, a UE may be configured to use the Angle of Arrival (AoA) and received beam index for TA validation as part of a PUR procedure. In an embodiment, a UE may also perform autonomous TA adjustment using AoA measurement(s).

One embodiment is directed to a system that allows for TA validation and/or dynamic TA adjustment by a UE configured for PUR, for example, using beam index and RSTD. In an embodiment, a UE configured for PUR may measure time of arrival (TOA) on multiple beams from multiple gNBs (e.g. using positioning reference signal (PRS) or synchronization signal block (SSB)) and determine reference RSTD values. According to one example, the UE may be configured to measure the TOA and determine the reference RSTD values before moving to Radio Resource Control (RRC) idle or inactive mode. This configuration may be done such that the UE does not need to blindly measure all the beams from all nearby gNB(s). In an embodiment, the TOA measurements may be associated with the latest or most recent TA value configured by the gNB.

According to certain embodiments, the determination of reference RSTD value(s) may be performed several ways. In one embodiment, the gNB may inform the UE of the reference RSTD value(s) directly, using its knowledge of the position of the UE and/or other gNB(s) (if known) or using the prior RSTD which was reported by the UE. In another embodiment, the UE may save the latest RSTD measurement it has performed (from the correct gNBs) and use this as the reference RSTD later. In another embodiment, the UE may be aware of its position and the position of the gNB(s) (e.g., if it has performed UE based positioning) and may use that knowledge to calculate the reference RSTD. In one embodiment, the UE or gNB may request for the reference RSTD from the location management function (LMF) and then the LMF or gNB may send this reference RSTD configuration to the UE.

In some embodiments, when the UE has data to transmit using PUR, the UE may receive RS on multiple beams (at least from the serving gNB) and measure the TOA of each beam. For example, in an embodiment, the UE may measure first arrival TOA across multiple RS beams to determine if its beam index (e.g., PRS ID which is associated with a beam or the SSB index associated with the beam) has changed or is still valid. FIG. 1 illustrates an example for how the beam index may be determined or selected, according to certain embodiments. In an embodiment, these same TOA values can also be used to measure the RSTD, so as to minimize the number of measurements.

According to an embodiment, the UE may use first arrival TOA across multiple RS beams from each gNB to select the beam index(es) of the best beam(s). It is noted that this TOA is relative to the symbol or slot that the RS beam is known to be transmitted on. Therefore, first arrival TOA refers to the beam that arrives first relative to its transmission time.

In some embodiments, the UE may perform the beam index validation and/or RSTD measurement with one or more gNB(s). It may be assumed that at most one of these beams would be line of sight (LOS) at a time for UE. In an embodiment, if the UE determines that the first arrival TOA belongs to an RS from a different beam, then the UE can determine that it may have moved. In one embodiment, instead of beam index, synchronization signal block (SSB) index may be used.

According to certain embodiments, the UE may calculate the RSTD between the RS received on the best beams from each gNB. In this way, the UE may measure at least one RSTD. As an example, the best beams may refer to the first arriving beams in time at the UE, the strongest beam as measured by the UE (e.g., using RSRP or signal-to-noise ratio), the beam used the by gNB for data communication, or the preferred beam as reported by the UE to the gNB. In an embodiment, the UE may then compare the RSTD(s) with the expected RSTD.

Figure 2:
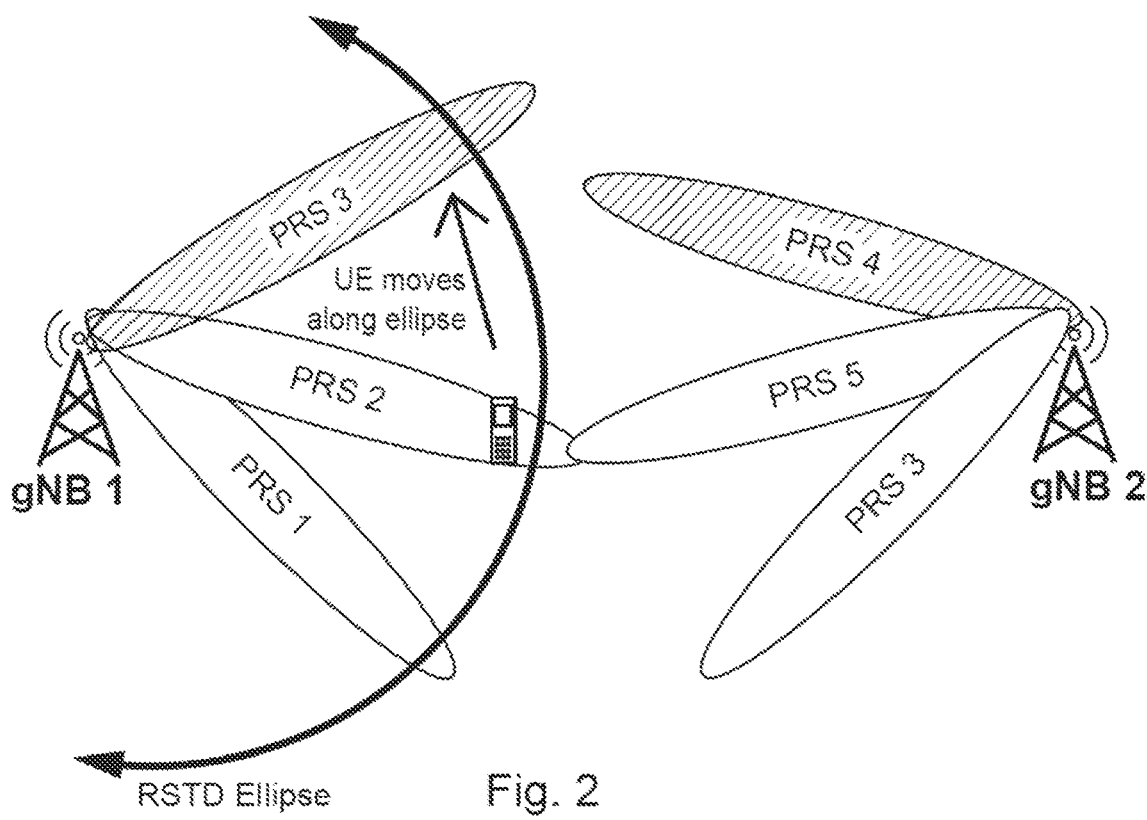
FIG. 2 illustrates an example system depicting when a UE moves along a RSTD ellipse and beam index allows detection of this movement, according to an embodiment.

In some embodiments, the UE may perform TA validation using measured RSTD and RS beam indexes according to the following. First, measured RSTD may be compared with the reference RSTD. In one example, as a baseline, one RSTD is compared; however, alternatively, two or more RSTD values could be measured and compared. Then, RS beam index(es) may be compared with reference RS beam index(es). If the measured RSTD is within a certain range of the reference RSTD and the RS beam index(es) is/are the same as the reference RS beam index(es), then the TA is validated. As a result, a single RSTD value (with the help of beam index) can validate the TA, where previously RSTD alone was ambiguous. FIG. 2 illustrates an example in which a UE moves along a RSTD ellipse and the beam index allows detection of this movement. It is noted that, in another embodiment, the UE may perform TA validation using the AoA and RS beam indexes.

Figure 3:
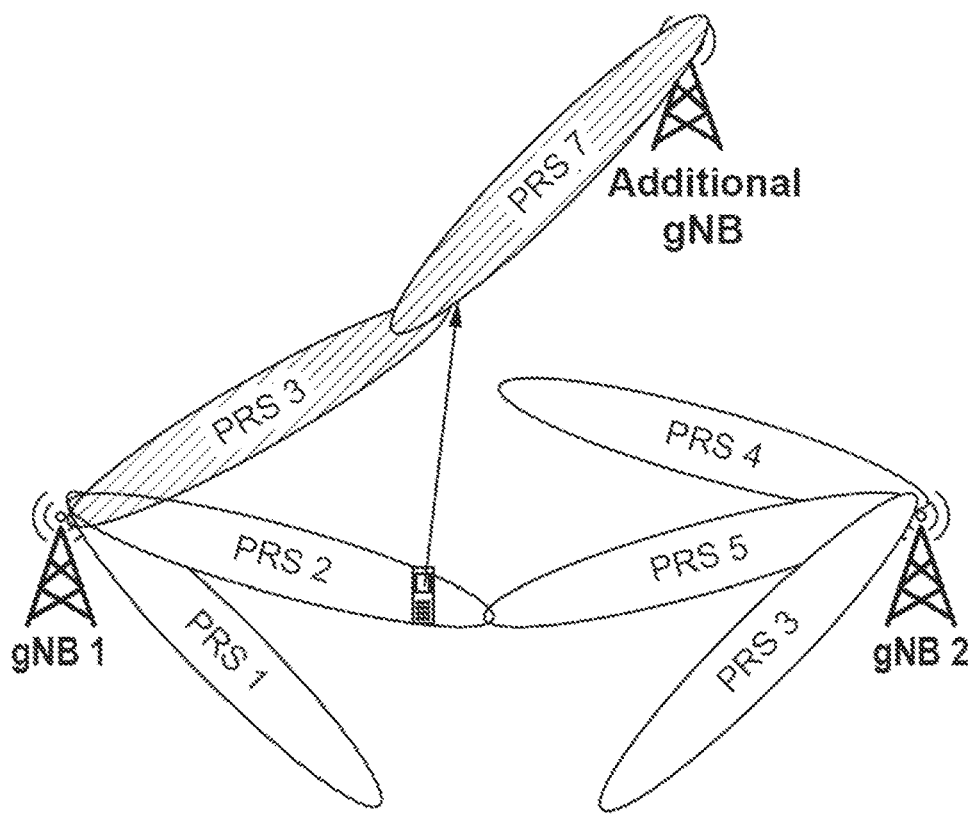
FIG. 3 illustrates an example system depicting possible additional RSTD measurement that may be triggered by detection of a beam, according to an embodiment.

In another embodiment, if the beam index(es) have changed but the RSTD has only changed within a given range (which may be a different range than the previous embodiment), then the TA may still be validated. In another embodiment, if the beam index(es) have changed, then the UE may perform additional RSTD measurements according to some rule and then may determine if the TA is valid or not. This rule may be sent in some assistance data from the network prior to the UE being sent to idle or inactive mode. The identity of the neighbor gNB and any assistance information relevant to it would be included in the assistance information during PUR configuration. For example, in an embodiment, the UE may measure the RSTD between the serving cell and an additional neighbor gNB. FIG. 3 illustrates an example of the additional RSTD measurement that may be triggered by detection of new PRS beam 3 from gNB 1 by the UE. Similarly, if PRS beam 1 was detected, it may trigger an additional RSTD measurement using a different additional neighbor gNB.

Figure 4:
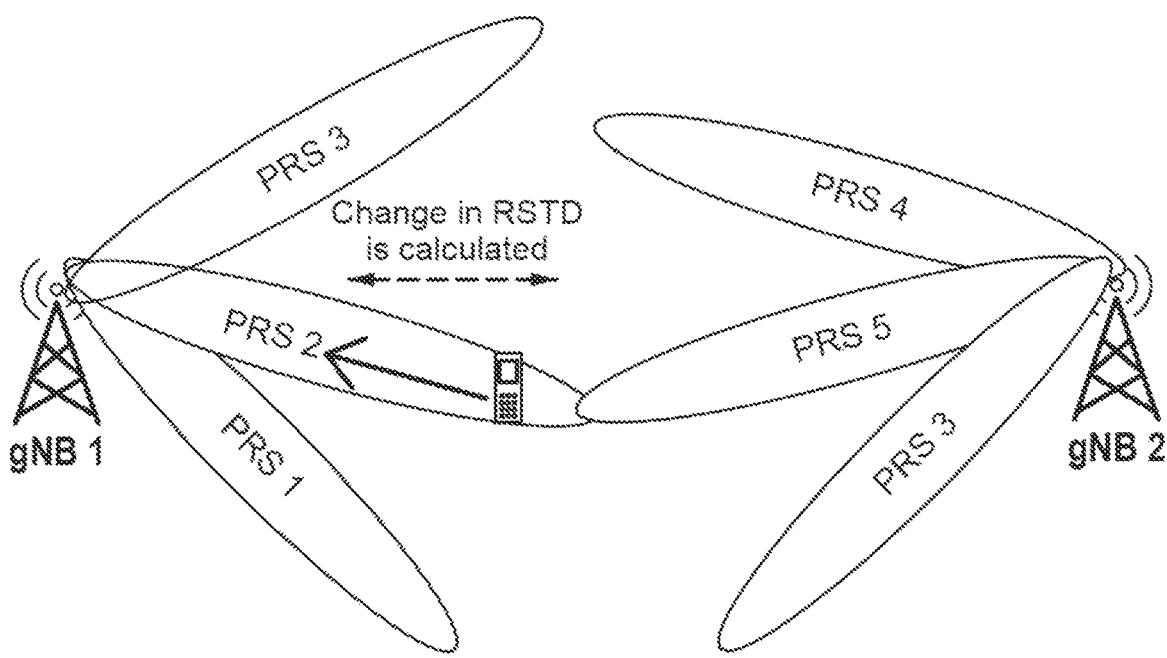
FIG. 4 illustrates an example system depicting the detection of a change in RSTD, according to an embodiment.

According to certain embodiments, when the UE has determined that the TA is valid, the UE may then transmit using PUR normally. In another embodiment, when the UE has determined that the TA is invalid, then the UE may autonomously correct or adjust the TA. In some embodiments, the correction of the TA may be performed using both the change in the RSTD(s) from its prior location as well as the change in the beam index(es), if any, from the RS beams. FIG. 4 illustrates an example of detecting change in RSTD when the beam index has remained the same and TA adjustment can be calculated by the UE. In one embodiment, after the UE has determined the TA is not valid, the UE may perform additional RSTD calculation using RS from additional gNB(s) to help determine the TA adjustment it should make. In one embodiment, the UE may rely on assistance information from the network to determine the TA adjustment based on the RSTD and the new beam index. This assistance information may be delivered during the PUR configuration step. In an embodiment, after autonomous TA adjustment, the UE may then transmit data using PUR. According to certain embodiments, the autonomous TA adjustment feature may be configurable by the gNB. For example, in certain cases, the gNB might not want the UE to adjust the TA by itself.

In some embodiments, the UE may inform the serving gNB of a dynamic change of the TA during PUR transmission (if any), for example, in some reserved bits (e.g. as part of the PUR transmission or via an uplink control channel). These bits may be optional and, for example, considered by the gNB to include TA information if a flag is set within the PUR transmission. In one embodiment, the UE may send back, to the gNB, the new beam index the UE is using in the reserved bits. In another embodiment, the UE may send back the new TA that the UE is using. In another embodiment, the UE may send back the RSTD(s) measured or the change in RSTD which prompted the new TA value. The gNB may forward this information to the LMF in some embodiments.

Figure 5:
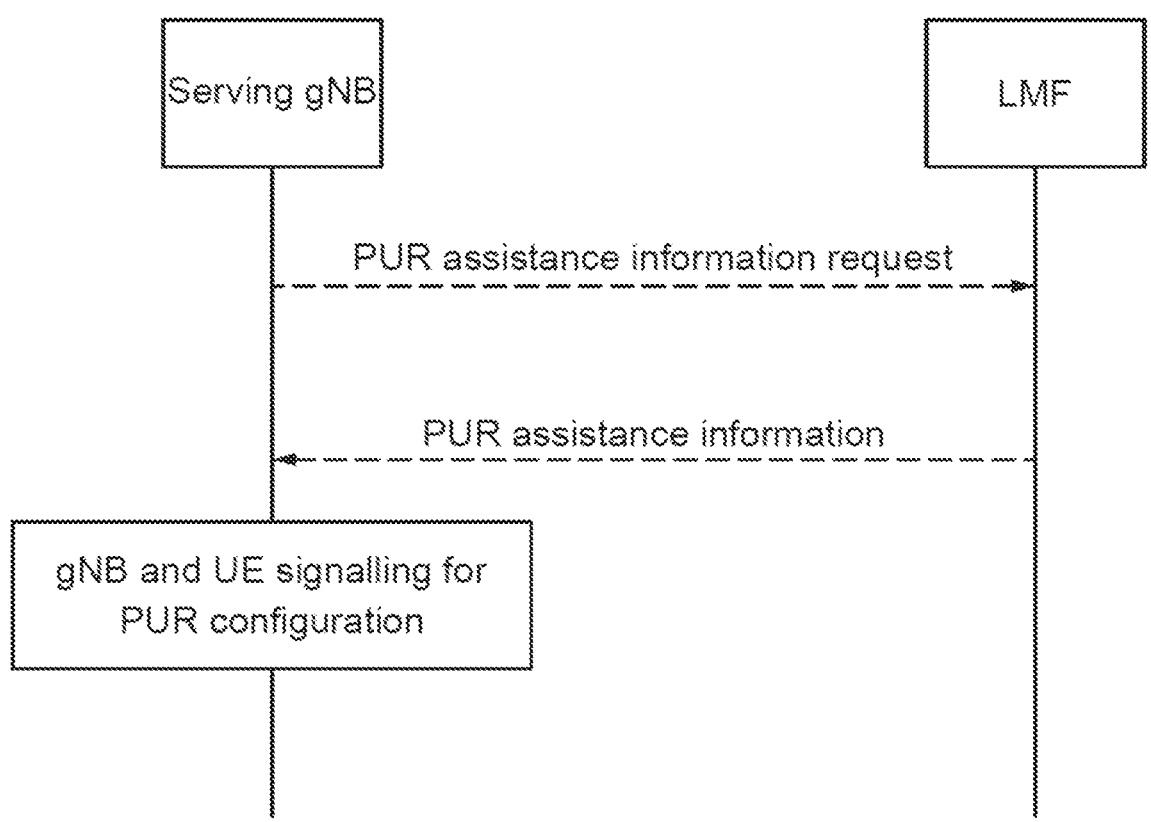
FIG. 5 illustrates an example signaling diagram depicting setup of PUR configuration, according to an embodiment.

As mentioned above, some embodiments may utilize assistance information that is sent from the network to the UE. FIG. 5 illustrates one example of the possible signaling between a serving gNB and LMF for proper setup of PUR configuration, according to certain embodiments. For example, a serving gNB may send a PUR assistance information request to request the location of neighbor gNB(s) from the location server (e.g., LMF). The serving gNB may then receive the requested PUR assistance information and signal this information to the UE, as discussed above.

Figure 6A:
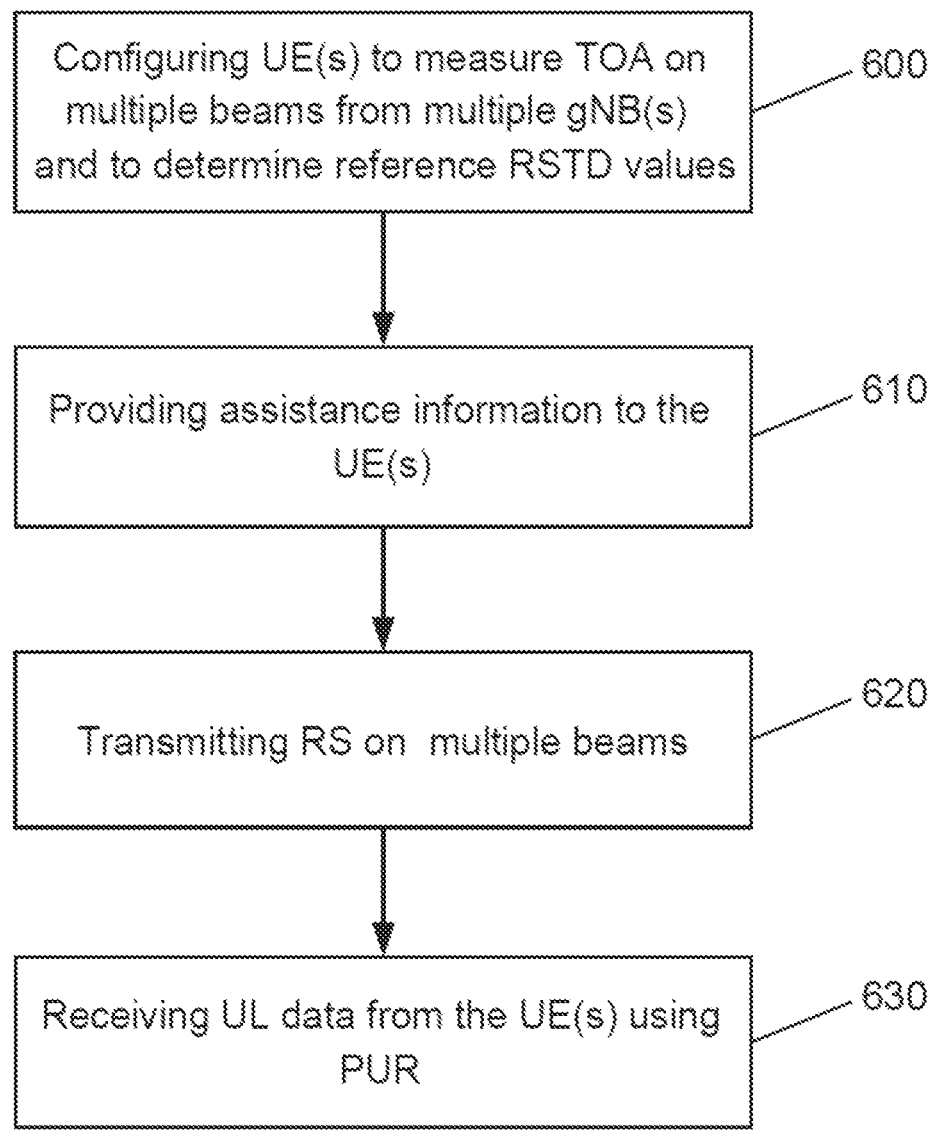
FIG. 6a illustrates an example flow diagram of a method, according to an embodiment.

FIG. 6a illustrates an example flow diagram of a method for TA validation and/or adjustment, according to one example embodiment. In certain example embodiments, the flow diagram of FIG. 6a may be performed by a network entity or network node in a 3GPP system, such as LTE or 5G NR. For instance, in some example embodiments, the method of FIG. 6a may be performed by an access point, base station, eNB, gNB, or the like.

In one embodiment, the method may include, at 600, configuring one or more UE(s) for PUR and/or, before moving to idle or inactive mode, configuring the UE(s) to measure TOA on multiple beams from multiple gNB(s) and to determine reference RSTD values. In an embodiment, the configuring 600 may include configuring the UE(s) such that they do not need to blindly measure all the beams from all nearby gNB(s). According to an embodiment, the TOA measurements may be associated with the latest or most recent TA value configured by the gNB serving the UE(s). In another embodiment, the configuring 600 may include requesting an Observed Time Difference of Arrival (OT-DOA) measurement.

In certain embodiments, the configuring 600 may include transmitting the reference RSTD to the UE(s). According to one embodiment, the method may include receiving the reference RSTD from a location server (e.g., LMF) before providing the reference RSTD to the UE(s). According to one embodiment, the method may include a request for the UE to calculate the reference RSTD itself, either using new measurements or previous measurements.

According to certain embodiments, the method may include, at 610, providing assistance information to the UE(s). In an embodiment, the assistance information may include a rule that may be used by the UE(s) to perform additional RSTD measurements, for example, when the UE(s) determine that the beam index(es) have changed. In an embodiment, providing 610 may include providing the rule in assistance information prior to the UE(s) being sent to idle or inactive mode. According to some embodiments, the assistance information may further include an identity of neighbor gNB(s) and any additional assistance information relevant to it. In certain embodiments, the assistance information may be requested and received from a location server, such as a LMF or local location management component (LMC), and then provided to the UE(s).

In some embodiments, when the UE(s) have data to transmit using PUR, the method may include, at 620, the gNB(s) transmitting RS on multiple beams. The UE(s) may be configured to measure the TOA of each beam or a subset of beams.

According to certain embodiments, when the UE(s) have determined that the TA is valid, the method may include, at 630, receiving UL data from the UE(s) using PUR normally. In another embodiment, when the UE(s) determine that the TA is invalid, then the UE(s) may dynamically correct or adjust the TA and then the method may include, at 630, receiving UL data from the UE(s) using PUR. In one embodiment, the UE(s) may correct the TA using the assistance information from the providing step 610 to determine the TA adjustment based on the RSTD and the new beam index. According to certain embodiments, the method may include configuring the dynamic correction or adjustment of the TA that may be performed by the UE(s).

In some embodiments, the receiving 630 may further include receiving an indication of the dynamic change of the TA during PUR transmission (if any). In one example, the dynamic change of the TA may be optionally indicated in some reserved bits. According to an embodiment, these reserved bits may be considered to include TA information if a flag is set within the PUR transmission. In one embodiment, the method may include receiving, from the UE(s), the new beam index the UE is using in the reserved bits. In another embodiment, the method may include receiving the new TA that the UE(s) are using. In another embodiment, the method may include receiving the RSTD(s) that the UE(s) measured during TA validation and/or adjustment.

Figure 6B:
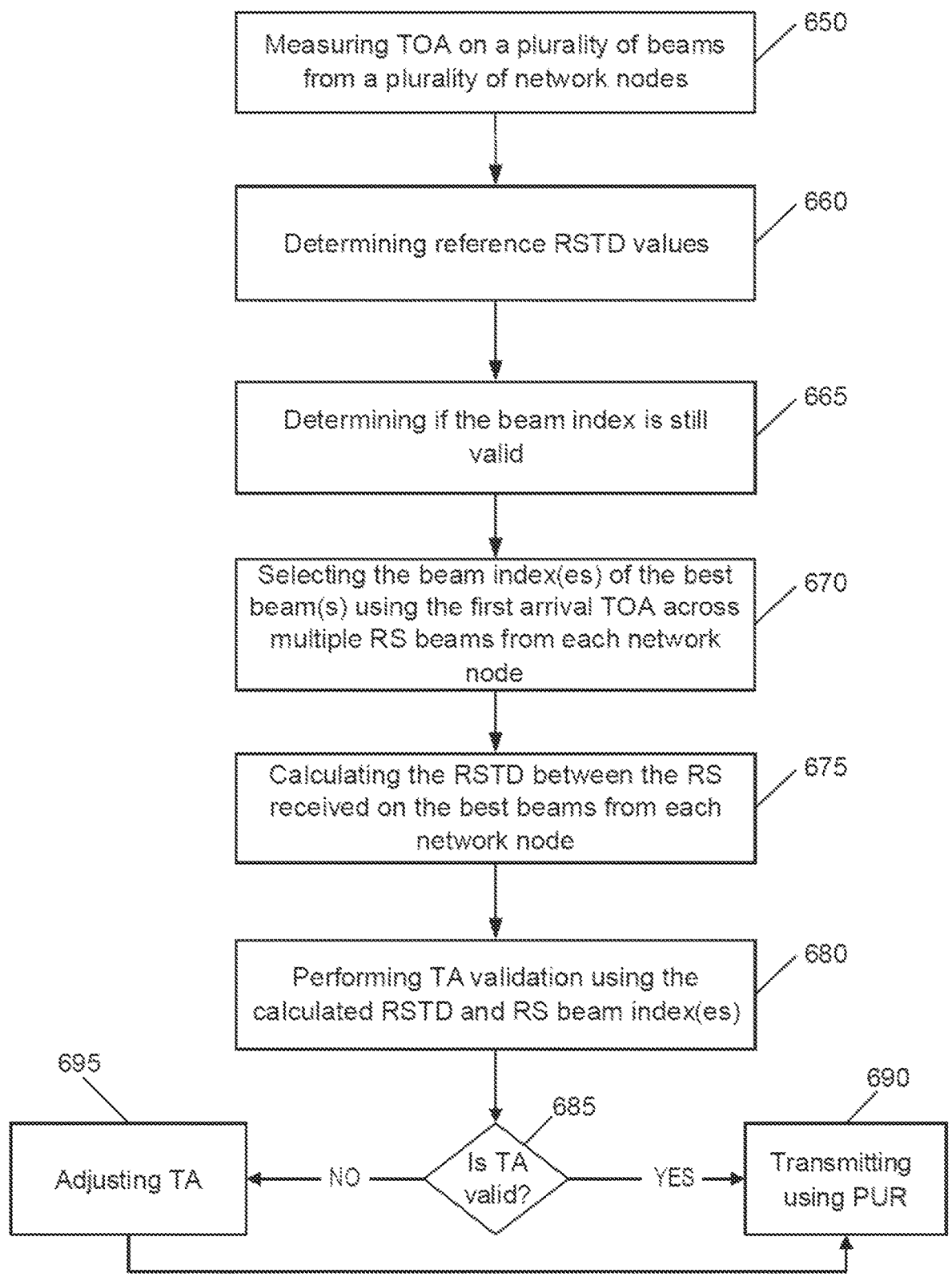
FIG. 6b illustrates an example flow diagram of a method, according to an embodiment.

FIG. 6b illustrates an example flow diagram of a method for validating and/or adjusting TA, according to one example embodiment. In an embodiment, the TA validation and/or adjustment may be performed using beam index and RSTD or AoA. In certain embodiments, the method of FIG. 6b may be performed by a mobile station, mobile device, UE, IoT device, terminal, or the like, for instance.

According to an embodiment, the method of FIG. 6b may include, at 650, measuring, at a PUR configured UE, TOA on a plurality of beams from a plurality of network nodes (e.g., gNBs). The measuring 650 of the beams may include measuring the beams using PRS or SSB, for example. According to one example, the measuring 650 may include the UE measuring the TOA before moving to idle or inactive mode. In an embodiment, the UE may be configured such that it does not need to blindly measure all the beams from all nearby gNB(s). According to an embodiment, the TOA measurements may be associated with the latest or most recent TA value configured by the gNB serving the UE.

In an embodiment, the method may also include, at 660, determining reference RSTD values. In one embodiment, the determining 660 of the reference RSTD may include directly receiving information from the gNB of the reference RSTD. In another embodiment, the determining 660 of the reference RSTD may include using the latest RSTD measurement that the UE has performed as the reference RSTD. In another embodiment, the determining 660 of the reference RSTD may include calculating the reference RSTD using knowledge of the UE's position and the position of the gNB(s). In another embodiment, the determining 660 of reference RSTD may include receiving the reference RSTD from the gNB, which received the reference RSTD from a location server (e.g., LMF or LMC). It is noted that, in some embodiments, AoA may be used instead of RSTD.

In some embodiments, when the UE has data to transmit using PUR, the method may include receiving RS on multiple beams (at least from the serving gNB) and measuring the TOA of each beam. For example, in an embodiment, the method may include, at 665, determining if the beam index is still valid. For example, in an embodiment, the method may include measuring first arrival TOA across multiple RS beams to determine if the beam index (e.g., PRS ID or SSB) is still valid. In an embodiment, the method may include using these same TOA values to measure the RSTD.

According to an embodiment, the method may include, at 670, selecting the beam index(es) of the best beam(s) using the first arrival TOA across multiple RS beams from each gNB. In some embodiments, the determining 665 may include performing the beam index validation and/or RSTD measurement with one or more gNB(s). In an embodiment, if it is determined that the first arrival TOA belongs to an RS from a different beam, then it may be determined that the UE has moved.

According to certain embodiments, the method may include, at 675, calculating the RSTD between the RS received on the best beams from each gNB. In an embodiment, the method may then include, at 680, performing TA validation using the calculated RSTD and RS beam index(es). As discussed above, in another embodiment, TA validation may be performed using the AoA and RS beam index(es).

In an embodiment, the performing 680 may include comparing the calculated RSTD with the reference RSTD. In one example, one RSTD may be compared. In other examples, two or more RSTD values may be measured and compared. Then, the performing 680 may include comparing the RS beam index with the reference RS beam index. If the measured RSTD is within a certain range of the reference RSTD and the RS beam index is the same as the reference RS beam index, then the result of the performing step 680 is that the TA is validated. In another embodiment, if the beam index(es) have changed but the RSTD has changed within a given range (which may be a different range than the previous embodiment), then the result of the performing step 680 is that the TA is validated. In another embodiment, if it is determined that the beam index(es) have changed, then the performing 680 includes performing additional RSTD measurements according to a rule and determining if the TA is valid or not. In an embodiment, the rule may be received in assistance data from the network prior to the UE being sent to idle or inactive mode. The identity of the neighbor gNB and any assistance information relevant to it may be included in the assistance information. For example, in an embodiment, the UE may measure the RSTD between the serving cell and an additional neighbor gNB.

According to certain embodiments, when it is determined that the TA is valid at 685, the method may include, at 690, transmitting using PUR normally. In another embodiment, when it is determined that the TA is invalid at 685, then the method may include, at 695, dynamically correcting or adjusting the TA. In some embodiments, the correcting 695 of the TA may be performed using both the change in the RSTD(s) from its prior location as well as the change in the beam index(es), if any, from the RS beams. In one embodiment, after it is determined the TA is not valid, the correcting 695 may include performing additional RSTD calculation using RS from additional gNB(s) to help determine the TA adjustment that should be made. In one embodiment, the correcting 695 may include using the assistance information from the network to determine the TA adjustment based on the RSTD and the new beam index. In an embodiment, after the autonomous TA adjustment, the method may then include transmitting 690 data using PUR. According to certain embodiments, the correcting 695 of the TA may be configurable by the gNB.

In some embodiments, the method may include informing the serving gNB of the dynamic change of the TA during PUR transmission (if any), for example, in some reserved bits. However, these reserved bits may be optional and, for example, considered by the gNB to include TA information if a flag is set within the PUR transmission. In one embodiment, the method may include sending back, to the gNB, the new beam index the UE is using in the reserved bits. In another embodiment, the method may include sending back the new TA that the UE is using.

Figure 7A:
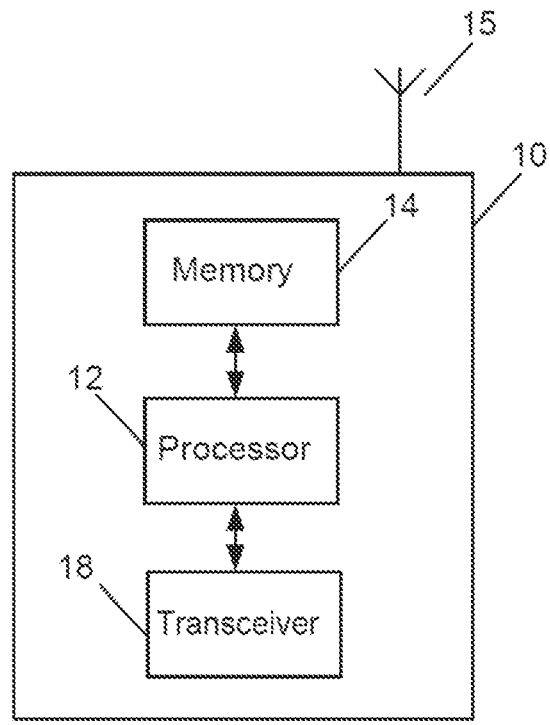
FIG. 7a illustrates an example block diagram of an apparatus, according to an embodiment.

FIG. 7*a* illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7*a*. As illustrated in the example of FIG. 7*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow or signaling diagrams illustrated in FIG. 1-5, 6a or 6b. In some embodiments, apparatus 10 may be configured to perform a procedure for TA validation and/or adjustment, for example.

For instance, in one embodiment, apparatus 10 may be controlled by memory 14 and processor 12 to configure one or more UE(s) for PUR and/or, before moving to idle or inactive mode, configure the UE(s) to measure TOA on multiple beams from multiple gNB(s) and to determine reference RSTD values. In an embodiment, apparatus 10 may be controlled by memory 14 and processor 12 to configure the UE(s) such that they do not need to blindly measure all the beams from all nearby gNB(s). According to an embodiment, the TOA measurements may be associated with the latest or most recent TA value configured by the gNB serving the UE(s).

In certain embodiments, apparatus 10 may be controlled by memory 14 and processor 12 to transmit the reference RSTD to the UE(s). According to one embodiment, apparatus 10 may be controlled by memory 14 and processor 12 to receive the reference RSTD from a location server (e.g., LMF or LMC) before then transmitting the reference RSTD to the UE(s).

In some embodiments, for example when the UE(s) have data to transmit using PUR, apparatus 10 may be controlled by memory 14 and processor 12 to transmit RS on multiple beams. The UE(s) may be configured to measure the TOA of each beam.

According to certain embodiments, apparatus 10 may be controlled by memory 14 and processor 12 to provide or transmit assistance information to the UE(s). In an embodiment, the assistance information may include a rule that may be used by the UE(s) to perform additional RSTD measurements, for example, when the UE(s) determine that the beam index(es) have changed. In an embodiment, apparatus 10 may be controlled by memory 14 and processor 12 to provide the rule in the assistance information prior to the UE(s) being sent to idle or inactive mode. According to some embodiments, the assistance information may further include an identity of neighbour gNB(s) and any additional assistance information relevant to it. In certain embodiments, the assistance information may be requested and received from a location server, such as a LMF, and then provided to the UE(s).

According to certain embodiments, for example when the UE(s) have determined that the TA is valid, apparatus 10 may be controlled by memory 14 and processor 12 to receive UL data from the UE(s) using PUR normally. In another embodiment, for example when the UE(s) determine that the TA is invalid, then the UE(s) may dynamically correct or adjust the TA and apparatus 10 may be controlled by memory 14 and processor 12 to receive UL data from the UE(s) using PUR. In one embodiment, the UE(s) may correct the TA using the assistance information previously provided to determine the TA adjustment based on the RSTD and the new beam index. According to certain embodiments, apparatus 10 may be controlled by memory 14 and processor 12 to configure the dynamic correction or adjustment of the TA that may be performed by the UE(s).

In some embodiments, apparatus 10 may be further controlled by memory 14 and processor 12 to receive an indication of the dynamic change of the TA during PUR transmission (if any). In one example, the dynamic change of the TA may be optionally indicated in some reserved bits. According to an embodiment, these reserved bits may be considered to include TA information if a flag is set within the PUR transmission. In one embodiment, apparatus 10 may be controlled by memory 14 and processor 12 to receive, from the UE(s), the new beam index the UE(s) are using in the reserved bits. In another embodiment, apparatus 10 may be controlled by memory 14 and processor 12 to receive the new TA that the UE(s) are using.

Figure 7B:
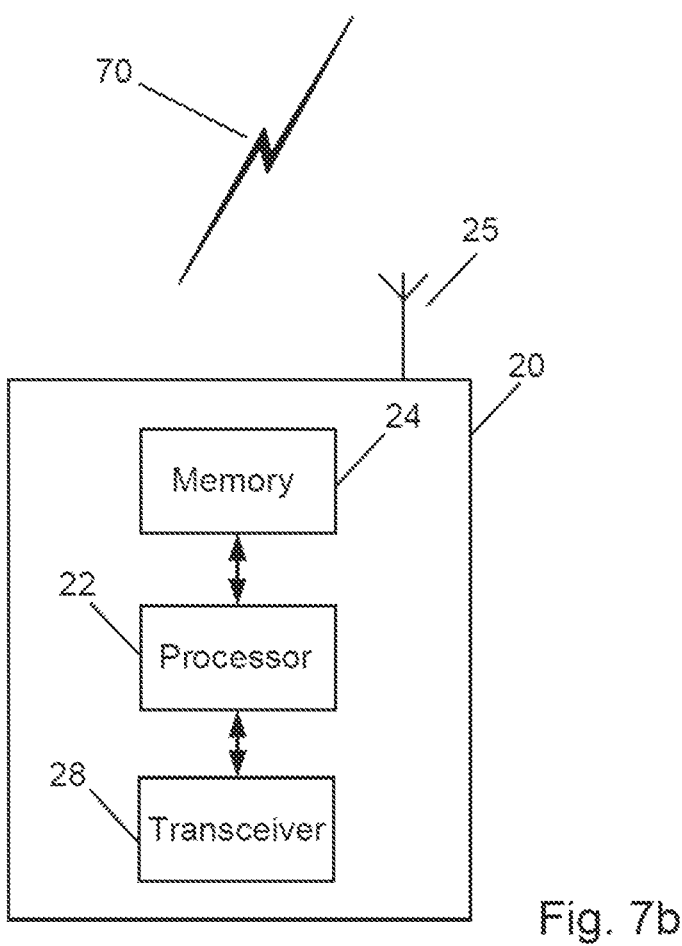
FIG. 7b illustrates an example block diagram of an apparatus, according to another embodiment.

FIG. 7b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. In one example embodiment, apparatus 20 may be a UE configured for PUR.

According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1-5, 6a or 6b. In certain embodiments, apparatus 20 may be configured to perform a procedure for validating and/or adjusting TA, for instance.

According to some embodiments, apparatus 20 may be controlled by memory 24 and processor 22 to measure TOA on a plurality of beams from a plurality of network nodes (e.g., gNBs). In an embodiment, apparatus 20 may be controlled by memory 24 and processor 22 to measure the beams using PRS or SSB, for example. According to one example, apparatus 20 may be controlled by memory 24 and processor 22 to measure the TOA before moving to idle or inactive mode. In an embodiment, apparatus 20 may be configured such that it does not need to blindly measure all the beams from all nearby gNB(s). According to an embodiment, the TOA measurements may be associated with the latest or most recent TA value configured by the gNB serving the apparatus 20.

In an embodiment, apparatus 20 may be controlled by memory 24 and processor 22 to determine reference RSTD values. In one embodiment, apparatus 20 may be controlled by memory 24 and processor 22 to determine the reference RSTD by directly receiving information from the gNB of the reference RSTD. In another embodiment, apparatus 20 may be controlled by memory 24 and processor 22 to determine the reference RSTD by using the latest RSTD measurement that the apparatus 20 has performed as the reference RSTD. In another embodiment, apparatus 20 may be controlled by memory 24 and processor 22 to calculate the reference RSTD using knowledge of the position of apparatus 20 and the position of the gNB(s). In another embodiment, apparatus 20 may be controlled by memory 24 and processor 22 to receive the reference RSTD from the gNB, which received the reference RSTD from a location server (e.g., LMF). According to some embodiments, AoA may be used instead of RSTD.

In some embodiments, when apparatus 20 has data to transmit using PUR, apparatus 20 may be controlled by memory 24 and processor 22 to receive RS on multiple beams (at least from the serving gNB) and measure the TOA of each beam. In an embodiment, apparatus 20 may be controlled by memory 24 and processor 22 to determine if the beam index is still valid. For example, in an embodiment, apparatus 20 may be controlled by memory 24 and processor 22 to measure first arrival TOA across multiple RS beams to determine if the beam index (e.g., PRS ID or SSB) is still valid. In an embodiment, apparatus 20 may be controlled by memory 24 and processor 22 to use these same TOA values to measure the RSTD.

According to an embodiment, apparatus 20 may be controlled by memory 24 and processor 22 to select the beam index(es) of the best beam(s) using the first arrival TOA across multiple RS beams from each gNB. In some embodiments, apparatus 20 may be controlled by memory 24 and processor 22 to perform the beam index validation and/or RSTD measurement with one or more gNB(s). In an embodiment, if it is determined that the first arrival TOA belongs to an RS from a different beam, then it may be determined that the apparatus 20 has moved.

According to certain embodiments, apparatus 20 may be controlled by memory 24 and processor 22 to calculate the RSTD between the RS received on the best beams from each gNB. In an embodiment, apparatus 20 may be controlled by memory 24 and processor 22 to perform TA validation using the calculated RSTD and RS beam index(es).

In an embodiment, apparatus 20 may be controlled by memory 24 and processor 22 to perform the TA validation by comparing the calculated RSTD with the reference RSTD. In one example, one RSTD may be compared. In other examples, two or more RSTD values may be measured and compared. Then, apparatus 20 may be controlled by memory 24 and processor 22 to compare the RS beam index with the reference RS beam index. If the measured RSTD is within a certain range of the reference RSTD and the RS beam index is the same as the reference RS beam index, then the TA is validated. In another embodiment, if the beam index(es) have changed but the RSTD has changed within a given range (which may be a different range than the previous embodiment), then the TA is also validated. In another embodiment, if it is determined that the beam index(es) have changed, then apparatus 20 may be controlled by memory 24 and processor 22 to perform additional RSTD measurements according to a certain rule and to determine if the TA is valid or not. In an embodiment, the rule may be received in assistance data from the network prior to the apparatus 20 being sent to idle or inactive mode. The identity of the neighbor gNB and any assistance information relevant to it may be included in the assistance information. For example, in an embodiment, apparatus 20 may be controlled by memory 24 and processor 22 to measure the RSTD between the serving cell and an additional neighbor gNB.

According to certain embodiments, when it is determined that the TA is valid, apparatus 20 may be controlled by memory 24 and processor 22 to transmit using PUR normally. In another embodiment, when it is determined that the TA is invalid, then apparatus 20 may be controlled by memory 24 and processor 22 to dynamically correct or adjust the TA. In some embodiments, apparatus 20 may be controlled by memory 24 and processor 22 to correct the TA by using both the change in the RSTD(s) from its prior location as well as the change in the beam index(es), if any, from the RS beams. In one embodiment, after it is determined the TA is not valid, apparatus 20 may be controlled by memory 24 and processor 22 to perform additional RSTD calculation using RS from additional gNB(s) to help determine the TA adjustment that should be made. In one embodiment, apparatus 20 may be controlled by memory 24 and processor 22 to use the assistance information from the network to determine the TA adjustment based on the RSTD and the new beam index. In an embodiment, after the autonomous TA adjustment, apparatus 20 may be controlled by memory 24 and processor 22 to transmit data using PUR. According to certain embodiments, a gNB may configure apparatus 20 as to how perform the adjustment of the TA.

In some embodiments, apparatus 20 may be controlled by memory 24 and processor 22 to inform the serving gNB of the dynamic change of the TA during PUR transmission (if any), for example, in some reserved bits. However, these reserved bits may be optional and, for example, considered by the gNB to include TA information if a flag is set within the PUR transmission. In one embodiment, apparatus 20 may be controlled by memory 24 and processor 22 to transmit, to the gNB, the new beam index that apparatus 20 is using in the reserved bits. In another embodiment, apparatus 20 may be controlled by memory 24 and processor 22 to transmit, to the gNB, the new TA that apparatus 20 is using.

Therefore, certain example embodiments provide several technical improvements, enhancements, and/or advantages. For example, one benefit of example embodiments is the ability of a UE to validate TA before PUR using just a single RSTD value and the beam index. As a result, one advantage is the ability of a PUR configured UE to transmit when it has moved enough to require a TA change. As example embodiments allow the TA to change without the updated signalling required by conventional methods, example embodiments are able to decrease the amount of signalling. Example embodiments also have the advantage of not requiring any RSRP measurements which are well known to potentially have large errors when used for positioning (or in this case detecting UE movement outside of an area).

Therefore, certain embodiments provide accurate TA validation that truly reflects UE mobility, TA validation without relying on RSRP measurements, TA validation using a single RSTD value and beam index, and dynamically updating TA without additional signaling. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

A first embodiment is directed to a method that may include a network node configuring one or more UE(s) for PUR and/or, before moving to idle or inactive mode, configuring the UE(s) to measure TOA on a plurality of beams from a plurality gNB(s) and to determine reference RSTD values. The method may also include receiving data from the UE(s) using PUR.

In a variant, the configuring of the UE(s) may include configuring the UE(s) such that they do not need to blindly measure all the beams from all nearby gNB(s). According to a variant, the TOA measurements may be associated with a most recent TA value configured by the network node.

In a variant, the configuring of the UE(s) may include transmitting the reference RSTD to the UE(s). The configuring of the UE(s) may include transmitting the reference beam index(es). According to a variant, the method may include receiving the reference RSTD from a location server and providing, to the UE(s), the reference RSTD received from the location server. In a variant, when the UE(s) have data to transmit using PUR, the method may include transmitting RS on multiple beams.

According to a variant, the method may include providing assistance information to the UE(s). In a variant, the assistance information may include configuration information for the UE(s) to measure the RSTD(s). In a variant, the assistance information may include a rule that may be used by the UE(s) to perform additional RSTD measurements, for example, when the UE(s) determine that the beam index(es) have changed. In a variant, the assistance information may include providing the rule in assistance information prior to the UE(s) being sent to idle or inactive mode. According to a variant, the assistance information may further include an identity of neighbor gNB(s) and any additional assistance information relevant to it. In a variant, the assistance information may be requested and received from a location server and then provided to the UE(s). In a variant, the assistance information from a previous positioning occasion may be used by the UE(s), for example in the case of UE based positioning.

According to a variant, the receiving of the data may include, when the UE(s) have determined that the TA is valid, receiving UL data from the UE(s) using PUR normally. In another variant, when the UE(s) determine that the TA is invalid, then the UE(s) may autonomously correct or adjust the TA and then the receiving may include receiving UL data from the UE(s) using PUR. According to a variant, the method may include configuring or limiting the autonomous correction or adjustment of the TA that may be performed by the UE(s).

In a variant, the receiving may further include receiving an indication of the autonomous change of the TA during PUR transmission, if any. In a variant, the autonomous change of the TA may be optionally indicated in some reserved bits. According to a variant, the reserved bits may be considered to include TA information if a flag is set within the PUR transmission. In a variant, the method may also include receiving, from the UE(s), the new beam index(es) the UE(s) are using in the reserved bits. In another variant, the method may include receiving the new TA that the UE(s) are using. In another variant, the method may include receiving the RSTD(s) measurements that the UE(s) made during TA validation and adjustment. In another variant, information related to the autonomous change, or lack of change, of TA may be reported to the LMF.

A second embodiment is directed to a method that may include measuring, at a PUR configured UE, TOA on a plurality of beams from a plurality of network nodes. The method may also include determining reference RSTD values. When the UE has data to transmit using PUR, the method may include receiving RS on a plurality of beams and measuring the first arrival TOA across the plurality of beams to determine if the beam index(es) is(are) still valid. The method may also include selecting one or more beam indexes of the best or first beam(s) using the first arrival TOA across the multiple RS beams. The method may include calculating the RSTD between the RS received on the best or first beams from each of the network nodes. The method may then include performing TA validation using the calculated RSTD and RS beam index(es).

In a variant, the measuring may include the UE measuring the TOA before moving to idle or inactive mode. According to a variant, the TOA measurements may be associated with a most recent TA value configured by a network node serving the UE.

In a variant, the best or first beam(s) may refer to the first arriving beams in time at the UE or the strongest beam as measured by the UE.

In a variant, the determining of the reference RSTD, or reference RS beam index, may include directly receiving information from the network node of the reference RSTD or RS beam index. In another variant, the received information may include configuration information to measure the RSTD(s). In another variant, the determining of the reference RSTD, or reference RS beam index, may include using the latest RSTD measurement (or reference RS beam index measurement) that the UE has performed as the reference RSTD (or reference RS beam index). In another variant, the determining of the reference RSTD, or reference RS beam index, may include calculating the reference RSTD, or reference RS beam index, using knowledge of the UE's position and the position of the network node. In another variant, the determining of reference RSTD, or reference RS beam index, may include receiving the reference RSTD, or reference RS beam index, from the network node, which has received the reference RSTD from a location server.

In a variant, when the UE has data to transmit using PUR, the method may include receiving RS on multiple beams at least from the serving network node and measuring the TOA of each of the multiple beams. For example, in a variant, the method may include measuring first arrival TOA across the multiple RS beams to determine if the beam index (e.g., PRS ID or SSB) is still valid. In a variant, the method may include using these same TOA values to calculate the RSTD.

According to a variant, the selecting may include selecting the beam index(es) of the best beam(s) using the first arrival TOA across multiple RS beams from each of the network nodes. In a variant, the method may include determining if a beam index is still valid by performing a beam index validation and/or RSTD measurement with one or more network nodes. In a variant, if it is determined that the first arrival TOA belongs to an RS from a different beam, then it may be determined that the UE has moved.

In a variant, the performing of the TA validation may include comparing the calculated RSTD with the reference RSTD. Then, in a variant, the performing of the TA validation may include comparing the RS beam index with the reference RS beam index. If the measured RSTD is within a certain range of the reference RSTD and the RS beam index is the same as the reference RS beam index, then the result of the performing of the TA validation is that the TA is validated. In another variant, if the beam index(es) have changed but the RSTD has changed within a given range, then the result of the performing of the TA validation is that the TA is validated. In another variant, if it is determined that the beam index(es) have changed, then the performing of the TA validation includes performing additional RSTD measurements according to a certain rule and determining if the TA is valid or not. In a variant, the rule may be received in assistance data from the network prior to the UE being sent to idle or inactive mode.

According to a variant, when it is determined that the TA is valid, the method may include transmitting using PUR normally. In another variant, when it is determined that the TA is invalid, then the method may include, autonomously correcting or adjusting the TA. In a variant, the correcting of the TA may be performed using both the change in the RSTD(s) from its prior location as well as the change in the beam index(es), if any, from the RS beams. In one variant, after it is determined the TA is not valid, the correcting may include performing additional RSTD calculation using RS from additional network nodes to help determine the TA adjustment that should be made. In one variant, the correcting of the TA may include using the assistance information from the network to determine the TA adjustment based on the RSTD and the new beam index. In a variant, after the correcting of the TA, the method may include transmitting data using PUR. According to certain embodiments, the correcting of the TA may be configurable or limited by the network node.

In a variant, the method may include informing the network node of the autonomous change of the TA during PUR transmission (if any), for example, in some reserved bits. In a variant, the method may include transmitting, to the network node, the new beam index(es) the UE is using in the reserved bits. In another variant, the method may include transmitting, to the network node, the new TA that the UE is using. In another variant, the method may include transmitting the RSTD(s) measurements that the UE(s) made during TA validation and adjustment. In another variant, information related to the autonomous change of TA may be reported to the LMF.

A third embodiment is directed to an apparatus including at least one processor and at least one memory comprising computer program code. The at least one memory and computer program code may be configured, with the at least one processor, to cause the apparatus at least to perform the method according to the first embodiment or the second embodiment, or any of their variants.

A fifth embodiment is directed to an apparatus that may include circuitry configured to perform the method according to the first embodiment or the second embodiment, or any of the variants discussed above.

A sixth embodiment is directed to an apparatus that may include means for performing the method according to the first embodiment or the second embodiment, or any of the variants discussed above.

A seventh embodiment is directed to a computer readable medium comprising program instructions stored thereon for performing at least the method according to the first embodiment or the second embodiment, or any of the variants discussed above.

One having ordinary skill in the art will readily understand that the example embodiments as discussed above may be practiced with steps in a different order, and/or with hardware elements in configurations which are different than those which are disclosed. Therefore, although some embodiments have been described based upon these examples preferred embodiments, it would be apparent to those of skill in the art that certain modifications, variations, and alternative constructions would be apparent, while remaining within the spirit and scope of example embodiments.

The invention claimed is:

1. An apparatus, comprising:
   at least one processor; and
   at least one memory comprising computer program code,
   the at least one memory and computer program code configured, with the at least one processor, to cause the apparatus at least to:
   measure time of arrival on a plurality of beams from a plurality of network nodes, wherein the apparatus is configured with preconfigured uplink resource;
   determine reference signal time difference values;
   when the apparatus has data to transmit using the preconfigured uplink resource, receive reference signal on a plurality of beams and measuring a first arrival time of arrival across the plurality of beams to determine if beam indexes are still valid;
   select one or more of the beam indexes of a best or first beams using the first arrival time of arrival across multiple reference signal beams;
   calculate a reference signal time difference between the reference signal received on the best or first beams from each of the network nodes; and
   perform timing advance validation using the calculated reference signal time difference and reference signal beam indexes.

2. The apparatus of claim 1, wherein the at least one memory and computer program code are configured, with the at least one processor, to cause the apparatus at least to measure the time of arrival before or after the apparatus moves to idle or inactive mode.

3. The apparatus of claim 1, wherein the time of arrival measurements is associated with a most recent timing advance value configured by a network node serving the apparatus.

4. The apparatus of claim 1, wherein the best or first beams comprises at least one of first arriving beams in time at the apparatus or a strongest beam as measured by the apparatus.

5. The apparatus of claim 1, wherein, when determining the reference signal time difference or reference signal beam index, the at least one memory and computer program code are configured, with the at least one processor, to cause the apparatus to perform at least one of:
   directly receiving information from the network node of the reference signal time difference or reference signal beam index, wherein the received information comprises configuration information to measure the reference signal time difference;
   using a latest reference signal time difference measurement or reference signal beam index measurement, that the apparatus has performed as the reference signal time difference or reference signal beam index;
   calculating the reference signal time difference, or reference signal beam index, using knowledge of the apparatus position and a position of the network node; or
   receiving the reference signal time difference, or reference signal beam index, from the network node, which has received the reference signal time difference from a location server.

6. The apparatus of claim 1, wherein, when the apparatus has data to transmit using the preconfigured uplink resource, the at least one memory and computer program code are configured, with the at least one processor, to cause the apparatus at least to:
   receive reference signal on multiple beams at least from the serving network node and measuring the time of arrival of each of the multiple beams; and
   use measured time of arrival values to calculate the reference signal time difference.

7. The apparatus of claim 1, wherein the at least one memory and computer program code are configured, with the at least one processor, to cause the apparatus at least to:
   select the beam indexes of the best beams using the first arrival time of arrival across multiple reference signal beams from each of the network nodes; and/or
   determine if a beam index is still valid by performing at least one of a beam index validation or reference signal time difference measurement with one or more network nodes.

8. The apparatus of claim 1, wherein, when performing the timing advance validation, the at least one memory and computer program code configured, with the at least one processor, to cause the apparatus to perform at least one of:
   comparing the calculated reference signal time difference with a previously received or calculated reference signal time difference; or
   comparing the calculated reference signal beam index with the reference signal beam index.

9. The apparatus of claim 1, wherein,
   when the measured reference signal time difference is within a certain range of the previously received or calculated reference signal time difference and the measured reference signal beam index is the same as the reference signal beam index, then a result of the performing of the timing advance validation is that the timing advance is validated; and when the beam indexes have remained the same or changed but the measured reference signal time difference has changed within a given range, then the result of the performing of the timing advance validation is that the timing advance is validated; and when a determination that the beam indexes have changed is made, then the performing of the timing advance validation includes performing additional reference signal time difference measurements according to a certain rule and determining if the timing advance is valid or not.

10. The apparatus of claim 1, wherein,
when it is determined that the timing advance is valid, the at least one memory and computer program code are configured, with the at least one processor, to cause the apparatus at least to transmit using the preconfigured uplink resource normally.

11. The apparatus of claim 10, wherein the at least one memory and computer program code are configured, with the at least one processor, to cause the apparatus at least to:
inform the network node of an autonomous correction of the timing advance during the preconfigured uplink resource transmission, if any, in reserved bits; and
transmit, to the network node, new beam indexes the apparatus is using in the reserved bits.

12. The apparatus of claim 1, wherein,
when a determination that the timing advance is invalid is made, the at least one memory and computer program code are configured, with the at least one processor, to cause the apparatus at least to autonomously correct or adjust the timing advance.

13. The apparatus of claim 1, wherein the correcting of the timing advance is performed using a change in the measured reference signal time difference from its prior location and the change in the beam indexes, if any, from the reference signal beams.

14. The apparatus of claim 1, wherein, after a determination that the timing advance is not valid is made, the at least one memory and computer program code are configured, with the at least one processor, to cause the apparatus at least to perform additional reference signal time difference calculation using reference signal from additional network nodes to help determine the timing advance adjustment that should be made.

15. The apparatus of claim 1, wherein, when correcting the timing advance, the at least one memory and computer program code are configured, with the at least one processor, to cause the apparatus at least to use assistance information from the network to determine the timing advance adjustment based on the measured reference signal time difference and a new beam index.

16. The apparatus of claim 1, wherein, after the correcting of the timing advance, the at least one memory and computer program code are configured, with the at least one processor, to cause the apparatus at least to transmit data using the preconfigured uplink resource.

17. The apparatus of claim 1, wherein the at least one memory and computer program code are configured, with the at least one processor, to cause the apparatus at least to:
transmit, to the network node, a new timing advance that the apparatus is using.

18. The apparatus of claim 1, wherein the at least one memory and computer program code are configured, with the at least one processor, to cause the apparatus at least to transmit the reference signal time difference measurements that the apparatus made during timing advance validation and adjustment.

19. A method, comprising:
measuring, at a preconfigured uplink resource configured user equipment, time of arrival on a plurality of beams from a plurality of network nodes;
determining reference signal time difference values;
when the user equipment has data to transmit using the preconfigured uplink resource, receiving reference signal on a plurality of beams and measuring a first arrival time of arrival across the plurality of beams to determine if beam indexes are still valid;
selecting one or more of the beam indexes of a best or first beams using the first arrival time of arrival across multiple reference signal beams;
calculating a reference signal time difference between the reference signal received on the best or first beams from each of the network nodes; and
performing timing advance validation using the calculated reference signal time difference and reference signal beam indexes.

20. A non-transitory computer readable medium comprising program instructions stored thereon, which when executed by at least one processor, cause an apparatus at least to:
measure, at a preconfigured uplink resource configured user equipment, time of arrival on a plurality of beams from a plurality of network nodes;
determine reference signal time difference values;
when the user equipment has data to transmit using the preconfigured uplink resource, receiving reference signal on a plurality of beams and measuring the firsta first arrival time of arrival across the plurality of beams to determine if beam indexes are still valid;
select one or more of the beam indexes of a best or first beams using the first arrival time of arrival across multiple reference signal beams;
calculate a reference signal time difference between the reference signal received on the best or first beams from each of the network nodes; and
perform timing advance validation using the calculated reference signal time difference and reference signal beam indexes.

* * * * *